Oct. 2, 1934.  C. CAHN  1,975,446

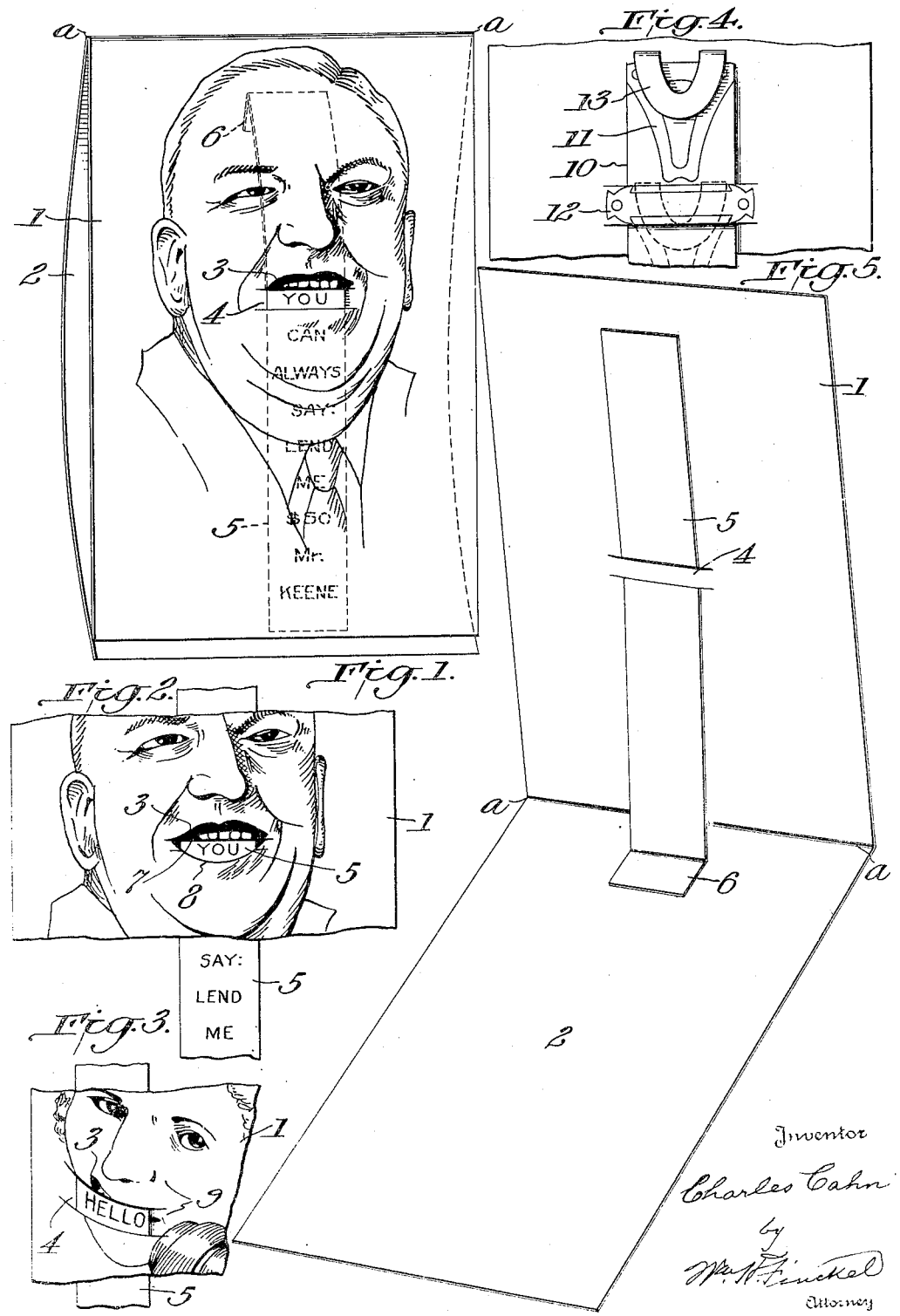

DISPLAY CARD

Filed April 6, 1934  2 Sheets-Sheet 2

Inventor
Charles Cahn
by
Wm H Finckel
Attorney

Patented Oct. 2, 1934

1,975,446

UNITED STATES PATENT OFFICE 1,975,446

DISPLAY CARD

Charles Cahn, Baltimore, Md., assignor to The Adpress, Baltimore, Md., a firm composed of Gilbert Michel and Charles Cahn Application April 6, 1934, Serial No. 719,385

14 Claims. (Cl. 46—37)

The invention relates to the type of display cards represented in the Cahn Patent No. 1,855,822, granted April 26, 1932, with the difference, among others, that one member contains reading matter that may be presented and exposed successively in an opening in the other member by relative movement of the parts, to simulate talking.

A preferred embodiment of the invention is in the form of a folded post card or mailing card, the folds being hinged together, one of the folds representing, for example, a head having an open mouth, back of which is a bridge through which passes a strip of material having transverse lines of printed matter and retained by said bridge in slidable position opposite the open mouth, and having its other end fixed to the other fold, so that by unfolding the folds relatively to one another, by a slow graduated motion, the printed lines will be successively exposed to view as within the open mouth, thereby simulating talking.

The invention is susceptible of various forms, and may be used with other printed matter in advertising merchandise. There may be on the card the representation of a single head for a monologue, or two or more such representations for dialogue or conversation. Instead of cards of mailable size they may be sufficiently larger or smaller to suit the purposes of the user. If the merchandise is of a suitable size, samples thereof may be attached to the card; and where available and the merchandise is constructed in separable parts these parts may be so mounted as to serve as stops to check the movement of the members.

Figure 6:
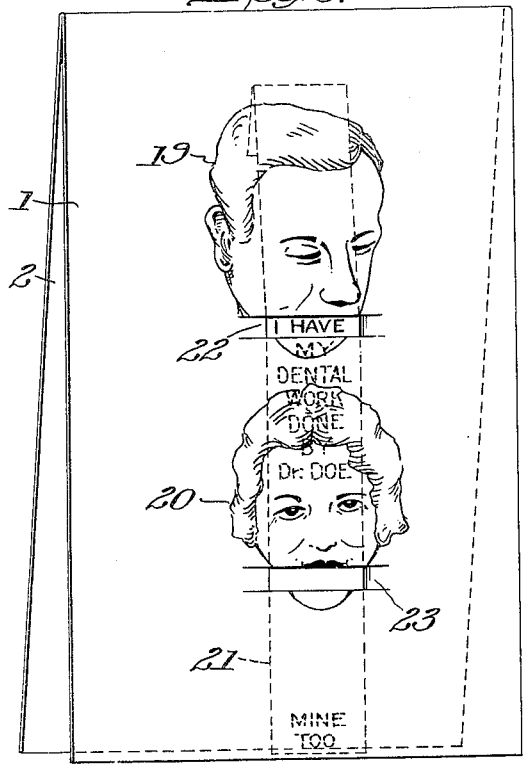
Figure 8:
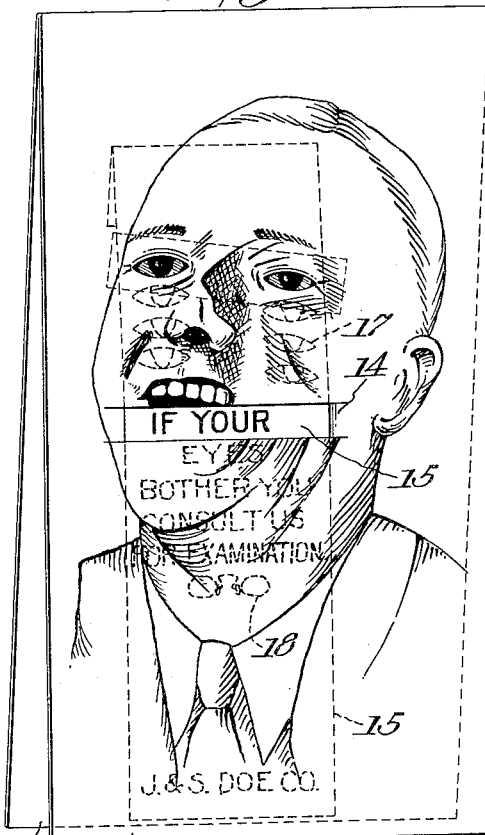
Figure 7:
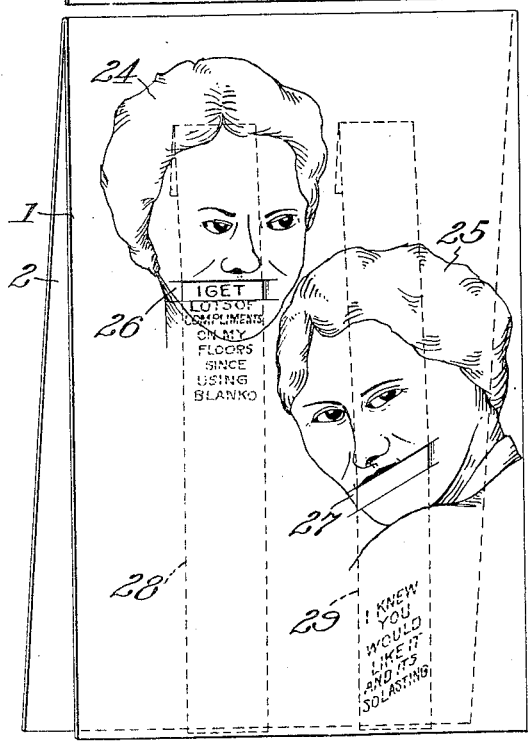
Figure 9:
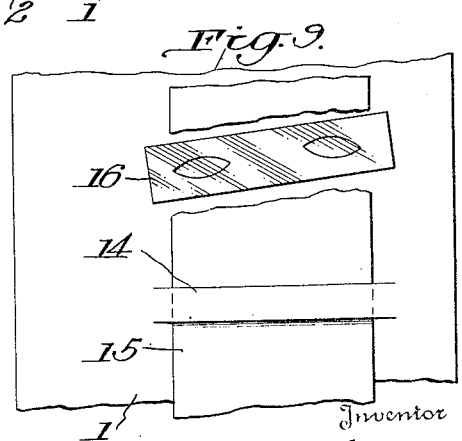

In the accompanying drawings illustrating the invention, in the several figures of which like parts are similarly designated, Figure 1 is a perspective view of a two part folded card, the front part being shorter than the back part so as to facilitate the unfolding of the card to expose on the front part the reading matter on the strip attached to the back part, one word on the strip being exposed in an opening in the front part and the remaining printed matter on the strip back of the front part being shown in broken lines. Fig. 2 is a fragmentary elevation showing a curvilinear opening in the front part. Fig. 3 is a fragmentary perspective view illustrating another form of a curvilinear opening and a strip having diagonally arranged printed matter. Fig. 4 is a fragmentary elevation showing the use and arrangement of one form of the stop feature, the broken lines showing the stop in action. Fig. 5 is a perspective view of the inside of the card opened; the views of Figs. 1 through 5, showing a monologue card. Fig. 6 is a perspective view of a card equipped with two alined heads, each with a mouth opening, and a single printed strip for the two, illustrating a dialogue form. Fig. 7 is a perspective view of a card equipped with two out-of-line heads, each with a mouth opening, and two printed strips, one for each head, illustrating another dialogue form. Fig. 8 is a perspective view illustrating still another monologue form, in which the head has not only the mouth opening, but also eye openings, the eye openings being covered with inside transparent material to present different aspects of the eyes and the eye glasses, for use primarily in advertising eye glasses or spectacles, and printed matter appropriate thereto, only one printed strip being used. Fig. 9 is a fragmentary elevation of the back illustrating the mouth bridge, the printed strip being broken away to expose the transparent strip across the eye openings. In Figs. 8 and 9 the mouth opening is wider than the distance between the corners of the mouth and sufficiently wide to take a printed strip having both eyes and printing thereon, and this increased width of the printed strip may be utilized for receiving more than one word of speech on a line.

In all of the illustrated forms, the card comprises a front part 1 and a back part 2, folded on the line a—a, of postcard size for mailing purposes, although the size may be increased or diminished to suit the user's purposes. The front part may have printed thereon or otherwise applied thereto a picture of a human face and adjacent parts, with the mouth 3 open and slitted with parallel transverse slits which form a bridge 4 beneath which is passed one end of a strip 5 on which is impressed any suitable printed matter. The opposite end of the strip is secured at 6 to the back part 2 so that when the front and back parts are moved relatively to one another, the strip will be moved lengthwise so as to present successively different portions of the printed matter which may form a sentence, the successive appearance of different words of the new matter issuing at the open mouth tending to simulate talking on the part of the picture on the front part. As shown in Fig. 1, the slits are parallel, but as shown in Fig. 2, one edge 7 may be straight and the lower edge 8 curved so as to make the lower lip more realistic. In the case of the representation of a human head at an angle, the realism may be accentuated by making the bridge 9 on arcs of circles, and the words on the strip arranged diagonally across the strip, as shown in Fig. 3.

As shown in Fig. 4, the leading end of the printed strip 10 may have attached thereto the picture of an article of merchandise or the article itself 11, and the bridge may be supplied with the representation of the complemental member of the article or such article itself 12. The member 11 is constructed with an overhanging hook portion 13 which cooperates with the portion 12, as indicated in broken lines in Fig. 4, so as to act as a stop to prevent the escape of the strip.

As shown in Fig. 1, the front part 1 may be shorter than the back part 2 so as to facilitate the unfolding of the card or relative movement of its parts to effect the functioning of talk-simulation.

As shown in Figs. 8 and 9, the functioning may be increased by provision across the mouth of a bridge 14 considerably wider than the mouth to receive a relatively wider printed strip 15, indicated by broken lines, and in the use of such strip there may be more than one word to a line. Furthermore, when the representation of the human head is used, openings may be made opposite the eyes, and the broader strip will accommodate both eyes. These eye openings may have placed back of them a strip 16 of transparent material so as to represent glasses, and the printed strip may be provided with pictures of eyes as at 17 and eye glasses 18, the representation of eye glasses being strengthened by the presence of the strip 16 of transparent material, which gives to them the appearance of glasses or lenses.

Figs. 1 to 5 and 8 to 9 show devices for use in presenting a monologue, while Figs. 6 and 7 present the device for use in dialogue.

Fig. 6 shows the representation of two alined heads 19 and 20, with one printed strip 21 and a separate bridge 22 and 23 across the respective mouths of these two heads. As indicated by the printed matter, the upper figure 19 is making a statement by the relative movement of the front and back parts, while nothing appears in the lower figure; but as indicated, when the upper figure has completed a sentence, the parts are brought into such position that the lower figure makes suitable response to what has been displayed by the upper figure and nothing appears in the upper figure but an unprinted portion of the strip.

Fig. 7 shows the representation of two heads 24 and 25 having separate bridges 26 and 27. These heads are out of alinement and thus require the use of separate printed strips 28 and 29 which are mounted on the card, one passing through head 24 and the other passing through head 25 and bearing different words, the words on one strip serving an affirmation and the other strip expressing a suitable response, thus simulating a dialogue.

The cards may be provided with any suitable or desirable reading matter, such as pictures, illustrations or designs, of an advertising or informative nature, for example. The printed strips may be utilized to carry also pictures of an article to be advertised.

The cards thus become active or factitious presentations of articles of merchandise.

As indicated in Fig. 7, when the images carrying the bridges are located out of alinement, the printed strips may be arranged to work at an angle in their longitudinal movement. In the head 25 the mouth opening and bridge are shown as set at an incline and the printed matter on the strip 29 is shown as similarly arranged.

As already stated, the main object of the invention is to produce an advertising or display card which presents the advertisement or display attractively and with simulation of talking.

When the last word has been exposed on the front through the opening or aperture in the object, the display card is opened to its full extent, thereby giving the advertiser the benefit of considerably more space for advertising and illustration purposes than would be obtained by reading the text only through the opening or aperture.

The advertising appears on the inner covers or portions, but may also be placed on the reverse sides, if desired, but the reverse side preferably is reserved for addressing or mailing purposes.

The picture on the front part may represent any animate or inanimate object.

I have indicated by the illustrated variations of embodiment of the invention, that it is to be understood that the invention is susceptible of other variations within the principle thereof and the scope of the claims following.

What I claim is:—

1. A display card, having a front part and a back part united so as to be movable toward and from one another, one part having the representation of an always open mouth and a fixed bridge across such mouth, and the other part having a printed strip fixed at one end to said last mentioned part and movable under the bridge by relative movement of said front and back parts and partially exposed in the open mouth.

2. A display card, having a front part and a back part united so as to be movable toward and from one another, one part having the representation of a human head with an always open mouth, the card being slitted across the mouth to form a fixed bridge, and the other part having fixed to it at one end a printed strip supported by said bridge in contact with the back of the head, said strip being movable longitudinally across the mouth opening by relative movement of one of the first two mentioned parts to present the printed matter on the strip in readable sequence.

3. A display card, having a front part and a back part united so as to be movable toward and from one another, one part having the representation of a human head with an immobile open mouth, the opening conforming to the shape of the lower lip, the card being slitted across the mouth to form a bridge, and the other part having fixed to it at one end a printed strip supported by said bridge in contact with the back of the head, said strip being movable longitudinally across the mouth opening by relative movement of the front and back parts to present the printed matter on the strip in readable sequence.

4. A display card, having a front part and a back part united so as to be movable toward and from one another, one part having the representation of a human head with an open mouth, the card being slitted across the mouth to form a bridge, and the other part having fixed to it at one end a printed strip supported by said bridge in contact with the back of the head, said strip being movable longitudinally across the mouth opening to present the printed matter on the strip opposite said open mouth in readable sequence, the head having eye openings and the printed strip having representations of eyes which by movement of the parts are successively displayed at the eye openings.

5. A display card, having a front part and a back part united so as to be movable toward and from one another, one part having the representation of a human head with an open mouth, the card being slitted across the mouth to form a bridge, and the other part having fixed to it at one end a printed strip supported by said bridge in contact with the back of the head, said strip being movable longitudinally across the mouth opening to present the printed matter on the strip in readable sequence, the head having eye openings and the printed strip having representations of eyes which by movement of the parts are successively displayed at the eye openings, the eye openings being underlaid by a transparent strip.

6. A display card, having a front part and a back part united so as to be movable toward and from one another, one part having the representation of a human head with an open mouth, the card being slitted across the mouth to form a bridge, and a printed strip attached to the other part at one end and supported by said bridge in contact with the back of the head, said strip being movable longitudinally across the mouth opening to present the printed matter on the strip in readable sequence, the head having eye openings and the printed strip having representations of eyes which by movement of the parts are successively displayed at the eye openings, the eye openings being underlaid by a transparent strip, the printed strip containing the picture of eye glasses as well as advertising reading matter and the picture of the eye glasses being movable into position registering with the eye openings and the transparent strip.

7. A display card, having a front part and a back part united so as to be movable toward and from one another, one part having an immobile aperture and a bridge across such aperture, and the other part having a strip fixed at one end to said last mentioned part and movable under said bridge by movement of the front and back parts toward and from one another and partially exposed through said aperture and bearing reading matter visible in said aperture as the strip is moved across it.

8. A display card, having a front part and a back part united so as to be movable toward and from one another, one part having a representation of an object and an immobile aperture and a bridge across such aperture, and the other part having a strip fixed at one end to said last mentioned part and movable under said bridge by movement of the front and back parts toward and from one another and partially exposed through said aperture and bearing reading matter visible in said aperture as the strip is moved across it.

9. A display card, having a front part and a back part united so as to be movable toward and from one another, one part having a representation of an articulate object and an always open aperture and a bridge across such aperture, and the other part having a strip fixed at one end to said last mentioned part and movable under said bridge by movement of the front and back parts toward and from one another and partially exposed through said aperture and bearing reading matter visible in said aperture as the strip is moved across it so as to simulate conversation.

10. A display card, having a front part and a back part united so as to be movable toward and from one another, one part having a picture of a head with an always open mouth and a bridge across such mouth, and the other part having a strip fixed at one end to said last mentioned part and movable under said bridge and partially exposed through said mouth and bearing reading matter visible in said apertured mouth as the strip is moved across it by movement of the front and back parts toward and from one another thereby to simulate talking.

11. A display card, having folded parts, one of such parts provided with a plurality of pictures of heads, each of which has an always open mouth backed up by a transverse bridge and a printed strip fixed at one end to the other part and having responsive reading matter adapted by movement of the folds of the card to be presented successively at the open mouths.

12. A display card, having folded parts, one of such parts provided with a plurality of pictures of heads in alinement, with always open mouths also in alinement, and a printed strip fixed at one end to the other part and associated with said mouths and adapted to be moved into position to present successively responsive reading.

13. A display card, having folded parts, one of such parts provided with a plurality of pictures of heads, each of which has an always open mouth backed up by a transverse bridge and a printed slip for each head fixedly supported on the other part behind the head on the individual bridge, said strips having conventional responsive reading matter, the individual strips being movable by relative movement of said folded parts in timed relation so as to present the printed matter in conversational manner.

14. A display card, having a front part and a back part united so as to be movable toward and from one another, the front part having the representation of an always open mouth and a bridge across such mouth, and the back part having a printed strip fixed at one end to said back part and movable under the bridge and partially exposed in the open mouth, the bridge and the printed strip having cooperative stop elements.

CHARLES CAHN.